United States Patent [19]

Curchod

[11] Patent Number: 5,188,417
[45] Date of Patent: Feb. 23, 1993

[54] CAR COVER AND ANCHORING ASSEMBLY

[75] Inventor: Donald B. Curchod, 345 Eleanor Dr., Woodside, Calif. 94062

[73] Assignee: Donald B. Curchod, Sunnyvale, Calif.

[21] Appl. No.: 766,327

[22] Filed: Sep. 26, 1991

[51] Int. Cl.$^5$ .............................................. B60J 11/00
[52] U.S. Cl. ...................................... 296/136; 150/166
[58] Field of Search ...................... 296/136, 98, 97.7; 150/166; 160/370.2

[56] References Cited

U.S. PATENT DOCUMENTS

| | | | |
|---|---|---|---|
| 4,560,245 | 12/1985 | Sarver | 296/97.7 |
| 4,856,842 | 8/1989 | Ross et al. | 296/136 |
| 4,863,210 | 9/1989 | Kenon | 296/136 |
| 4,867,216 | 9/1989 | McKee | 296/136 |
| 4,903,749 | 2/1990 | Hanania | 160/370.2 |
| 4,940,276 | 7/1990 | Madison | 296/136 |
| 4,948,191 | 8/1990 | Cao | 296/136 |
| 4,958,881 | 9/1990 | Piros | 296/136 |
| 5,029,933 | 7/1991 | Gillem | 296/136 |

FOREIGN PATENT DOCUMENTS 23706  8/1979  Japan .................... 296/136

*Primary Examiner*—Robert R. Song

[57] ABSTRACT

A storable cover for covering the cabin portion of a vehicle carries storage means secured thereto to be disposed in the trunk of the vehicle or other suitable compartment in a manner anchoring the trailing edge of the cover when the cover is disposed onto the vehicle. The storage means is affixed firmly inside the trunk of the vehicle so as to locate part of the cover assembly within a locked compartment. The cover is deployed by being taken out of the storage means and fed from the trunk through the opening which is created between the raised trunk lid and the rear windshield or body of the vehicle.

1 Claim, 5 Drawing Sheets

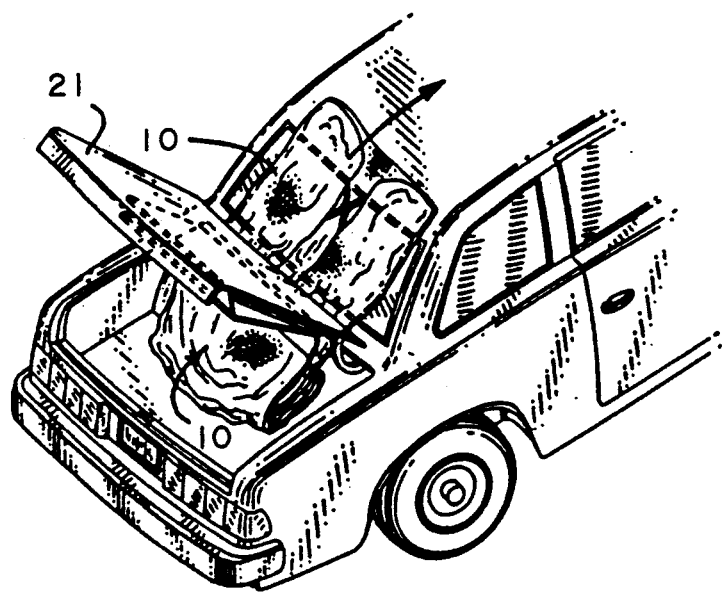
FIG.−5
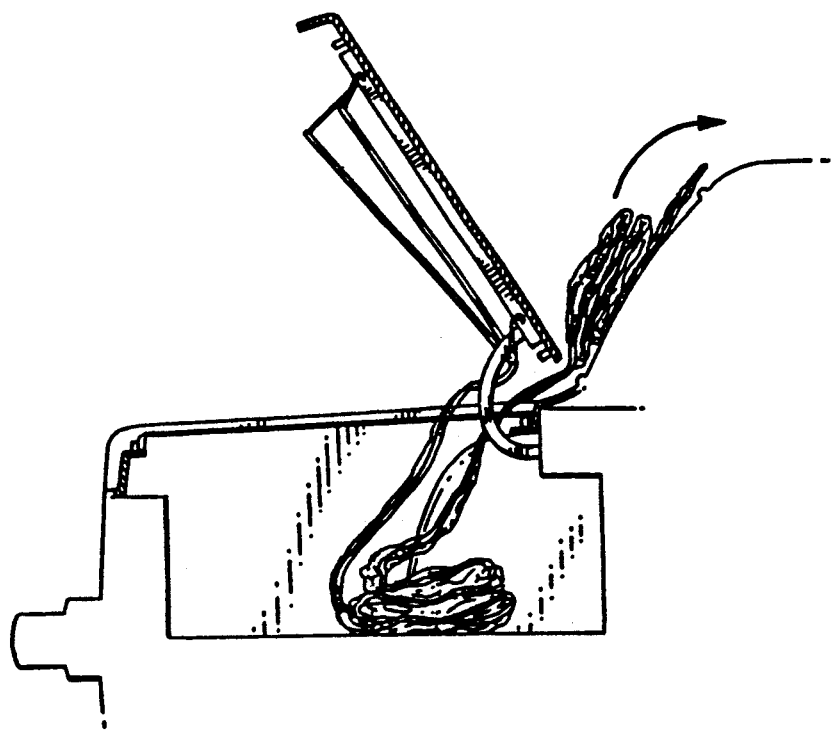
FIG.−6

CAR COVER AND ANCHORING ASSEMBLY

BACKGROUND OF THE INVENTION

This invention pertains to an improved vehicle cover and more particularly to such a cover including storage means which also serve to anchor an end of the cover to the vehicle.

It is known that sunlight damages the exposed surfaces of the interior of a vehicle. It is also known that when parked under direct sunlight, the vehicle's interior temperature rises due to the familiar greenhouse effect. This rise in temperature further damages the vehicle's interior. Furthermore, the hot air and the hot surfaces of the interior can prove uncomfortable for a person staying in or returning to the vehicle. Some articles in the vehicle such as magnetic media and electronic equipment can sometimes suffer from the elevated temperature as well.

In addition, when a vehicle is left to stand outside all night exposed to the elements, the finish on the vehicle will be dulled.

The general object of this invention is to provide sun protection for the interior of a vehicle by means of a highly effective, low cost, durable, easy to use, theft resistant and reflective sun protection cover to be deployed over the cabin of the vehicle.

The cover, its storage bag or pouch, and its attachment means for securing an end of the cover to an end of the vehicle are designed as a single integrated unit which significantly reduces the cost of the unit. It further makes the unit easier to use.

As shown herein the pouch is held firmly inside the trunk of the vehicle by plastic dipped hooks which engage openings in the trunk lid. The cover is deployed by being taken out of the trunk through the opening which is created between the trunk lid and the rear windshield or body of the vehicle when the trunk lid is opened. Accordingly, the deployment and storage of the cover can readily be handled by a single person requiring no special tools or the like. Since the cover is anchored or remains anchored securely at the trunk end thereof, it remains stable during deployment as well as during storage.

According to another feature of the invention, the cover uses the vehicle's own body parts to hold it in place when pulled over the cabin. At least one door of the vehicle is used to hold the cover in place by being closed onto it whereby the cover will fit underneath the upper portion of the door containing the window frame. The leading portion of the cover can be held in place by being tucked under the windshield wipers of the vehicle.

According to a further embodiment, the cover employs elastic strings disposed to be wrapped about the side view mirrors of the vehicle.

The foregoing design of the cover makes it substantially theft proof without requiring any specific tie-down or locks or alarms or the like. In the deployed position, the cover is firmly anchored to the interior of the trunk. With the trunk lid closed and locked it would be extremely difficult if not impossible to tamper or remove the cover from the vehicle. When the cover is stowed, the cover is safely locked within the trunk, concealed and out of sight.

SUMMARY OF THE INVENTION AND OBJECTS

In general as disclosed herein a storable vehicle cover for covering at least the cabin portion of a vehicle carries a storage means or pouch secured thereto to be disposed in the trunk of the vehicle in a manner anchoring the trailing edge of the cover when the cover is disposed onto the vehicle. The storage means or pouch remains affixed firmly inside the trunk of the vehicle. By opening the trunk lid of the vehicle the cover is in position to be readily removed from its associated pouch and fed from the trunk through the opening which is created between the raised trunk lid and the rear windshield or body of the vehicle.

In general it is an object of the present invention to provide an improved car cover.

It is another object of the invention to provide a car cover characterized by a storage pouch attached thereto and secured to the interior of an accessible compartment.

It is yet a further object of the invention to provide a car cover of the kind described having a reflective outer surface to minimize transmittal of heat into the vehicle.

It is yet an additional object of the invention to provide pie-shaped slits at the rear corners of the car cover associated with elastic strings bounding the space between the open end of the slits and extending further along the bottom edge of the cover whereby the cover assembly can accommodate a variety of sizes of vehicles.

Yet an additional object of the invention is the provision of a car cover having a relatively large open central region to permit wind to readily escape from beneath when it is being deployed.

Yet a further object of the invention is the provision of an improved method of deployment of a car cover onto a vehicle.

The foregoing and other objects of the invention shall become more readily evident from the following detailed description of preferred embodiments when considered in conjunction with the drawings.

BRIEF DESCRIPTION OF THE DRAWINGS

FIG. 5 shows a perspective view showing how the car cover can be fed through the opening between the trunk lid and the body of the vehicle;

FIG. 6 shows a side elevation view of the construction shown in FIG. 5 illustrating the feeding of the car cover through the opening formed between the trunk lid and the vehicle body;

DETAILED DESCRIPTION OF THE PREFERRED EMBODIMENTS

Preferably the nature of the material employed in the car cover 10 should be chosen to be wear and tear resistant, weather resistant, lightweight, thin, foldable, water resistant yet breathable, non-abrasive, non-sticking, stain resistant, washable, non-shrinking and able to hold print. One such material which provides the foregoing qualifications includes nylon.

Figure 1:
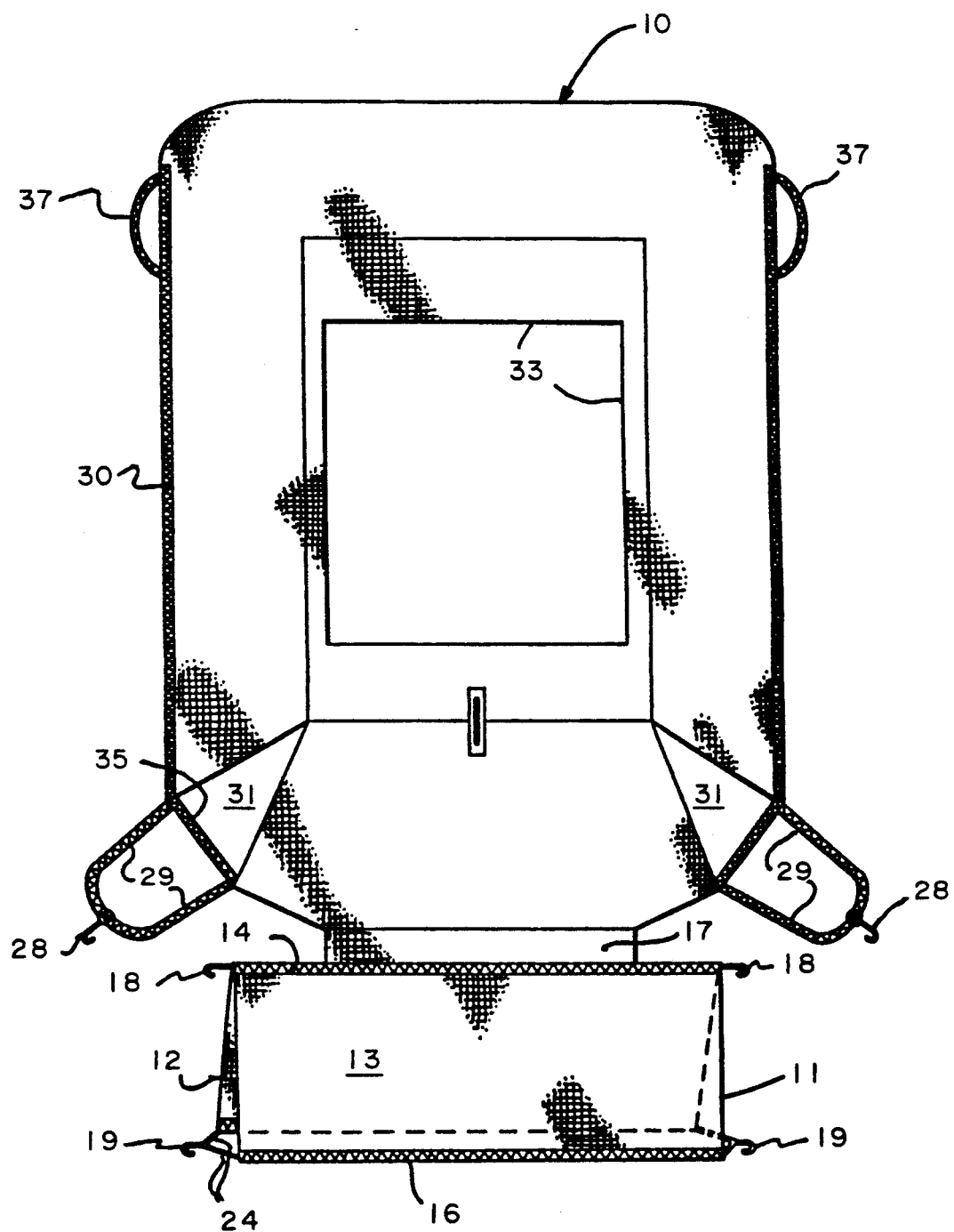
FIG. 1 shows a plan view of a car cover according to the invention.
Figure 2:
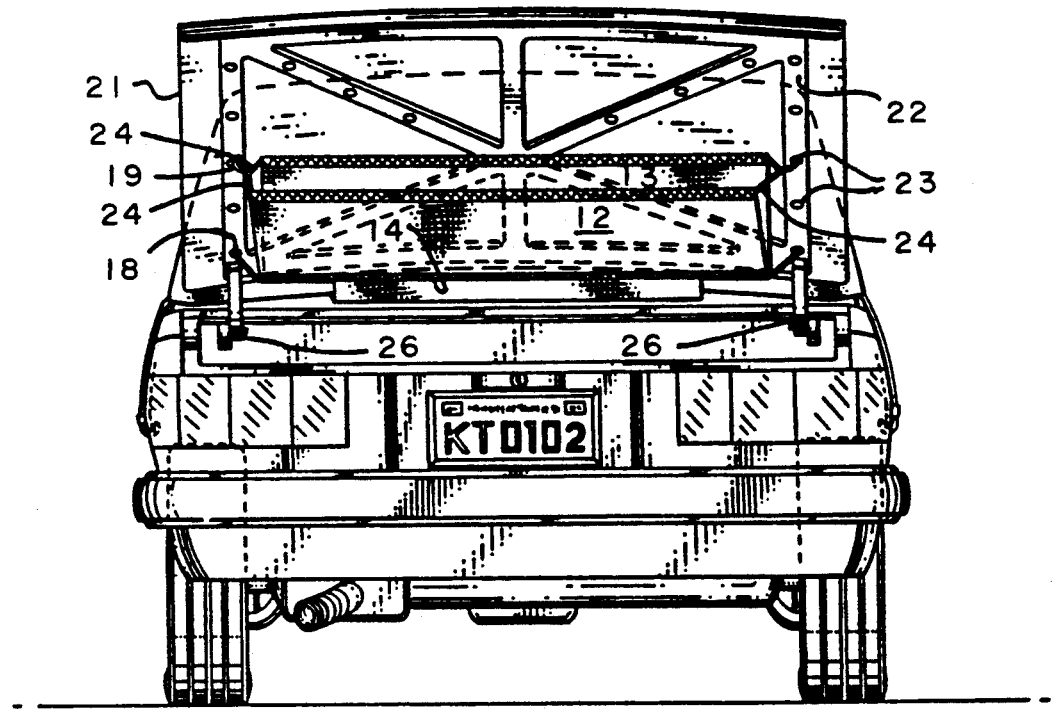
FIG. 2 shows the rear of a vehicle with its trunk raised and a storage pouch portion of the car cover disposed in place.

For the foregoing characteristics the sheet of material forming cover 10 should primarily be strong, flexible, and pliant. Cover 10 carries a storage unit or pouch 11 at the trailing end thereof as shown in FIG. 1. Storage unit 11 comprises a pair of fabric panels 12, 13. Panels 12, 13 are mutually joined together along a forward edge of each panel. One of panels 12, 13 is movable between raised and lowered positions with respect to the other said panel to form an open space therebetween for receiving the car cover 10 to be stored therein. Preferably, the trailing edge of both panels 12, 13 carries a flexible reinforcing material 16 sewn into the edge margin thereof so as to both reinforce the edge margin of panels 12, 13 and to permit the edge margin to flex when removing cover 10 therefrom.

Cover 10 includes a tail piece 17 of essentially flat material captured between the leading edge margins of panels 12, 13 of storage unit 11. Thus the leading edge margins 14 of panels 12, 13 are sewn together therealong and capture tail piece 17 therebetween.

Cover 10 has a sufficient scope so as to cover the trailing windshield, the leading windshield, and side windows of the vehicle to which it is to be employed.

Finally, storage unit 11 includes a plurality of plastic dipped hooks 18, 19 to be connected to the underside of trunk lid 21.

Thus, trunk lid 21 has been provided with the usual strengthening or reinforcing bars 22. Bars 22 as shown have been formed with a number of openings 23 therein which can be engaged by the ends of hooks 18, 19. As thus arranged, a storage pouch for use in a vehicle has been provided comprising confronting flexible side panels 12, 13 wherein the side panels are joined along a given edge 14 while an opening is formed along the edge of pouch 11. A plurality of hooks 18, 19 coupled to pouch 11 serve to support same from the underside of the interior of a compartment of the vehicle. Hooks 19 each support the trailing edge of a pair of edges 16 of pouch 11 by means of an elastic band 24. Thus band 24 serves to pull the trailing corners of panels 12, 13 together while hook 19 supports both of the trailing edges.

A pair of spaced apart hinges 26 serves to support truck lid 21 for movement between lowered and raised positions.

Figure 3:
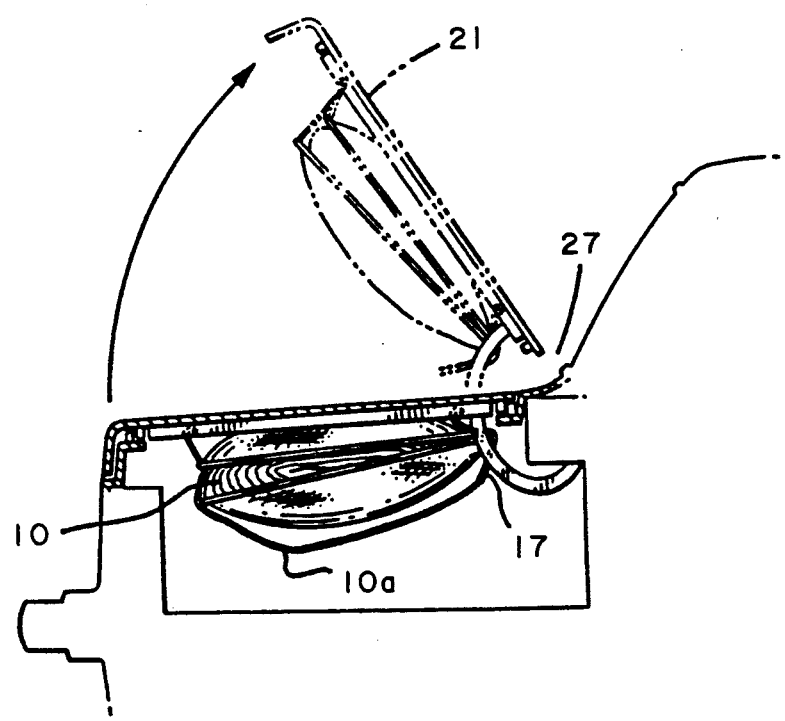
FIG. 3 shows a side elevation of a vehicle trunk containing a car cover stored therein.
Figure 4:
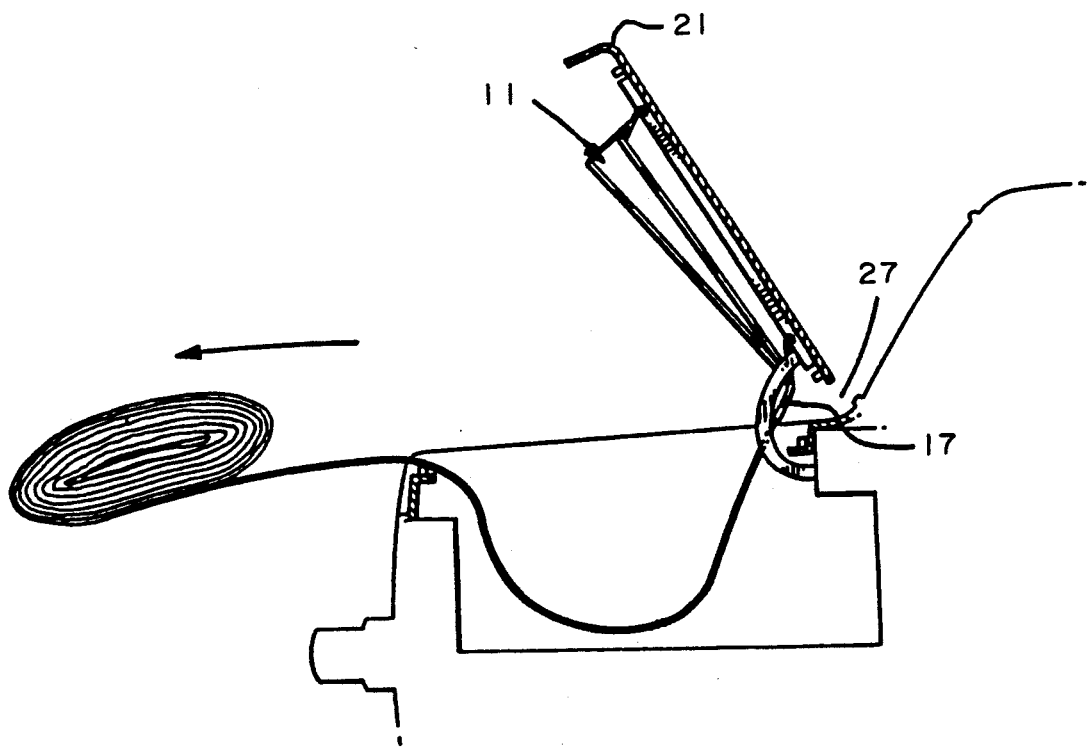
FIG. 4 shows a side elevation showing the removal of the car cover from the pouch carried by the closure of the trunk.

As shown in FIGS. 3 and 4 with truck lid 21 in its raised position an opening 27 is defined between the leading edge of trunk lid 21 and the body of the vehicle.

As shown in FIG. 3, the tail piece 17 joins the balance of the cover 10 to pouch 11. Accordingly a very small length 10a of cover 10 will underlie pouch 11 when the cover has been stored therein. When it is desired to employ cover 10 to protect the interior and exterior of a vehicle of a type having a compartment such as the trunk accessible via a moveable closure carried on a pair of laterally spaced hinges connected to the vehicle body, the method of installing the cover comprises the steps of forming a sheet of reflective material such as cover 10 which is sufficient to overlay the front windshield, rear windshield and side windows of the vehicle. The next step is to form at one end of the sheet a storage pouch having a top and bottom surface portions. Next the surface portions are yieldingly retained to be carried within the compartment of the vehicle from the underside of the closure thereof. The next step is to open the compartment, then remove the sheet of material forming cover 10 from the pouch 11. Next the sheet of material forming cover 10 is fed from the trunk compartment onto the roof of the vehicle via opening 27 formed between the vehicle body and an edge of the closure 21 and defined between hinges 26. The next step is to clamp the sheet of material forming cover 10 between closure 21 and the vehicle body to retain an end of the cover 10 anchored in place.

In addition to the above, it has been found desirable to add the additional step of closing a side door of the vehicle onto cover 10 in a manner clamping that portion of the sheet material covering the side window between the vehicle body and the door to retain the sheet in a covering relation to the window and the door. Once cover 10 has been generally positioned on the top of the vehicle, the rear corners of cover 10 can be anchored by means of hooks 28 carried by an elastic band 29 bridging the triangular slit 31. Accordingly hooks 28 are preferably plastic dipped or otherwise treated in order to permit them to readily engage the edge 32 of the wheel opening for a vehicle. (See FIG. 7.)

As mentioned above, in order to avoid capturing the substantial gust of air beneath cover 10 as it is being applied to the vehicle and thereby make it difficult to handle, a relatively large opening 33 has been formed in the top of cover 10.

Figure 8:
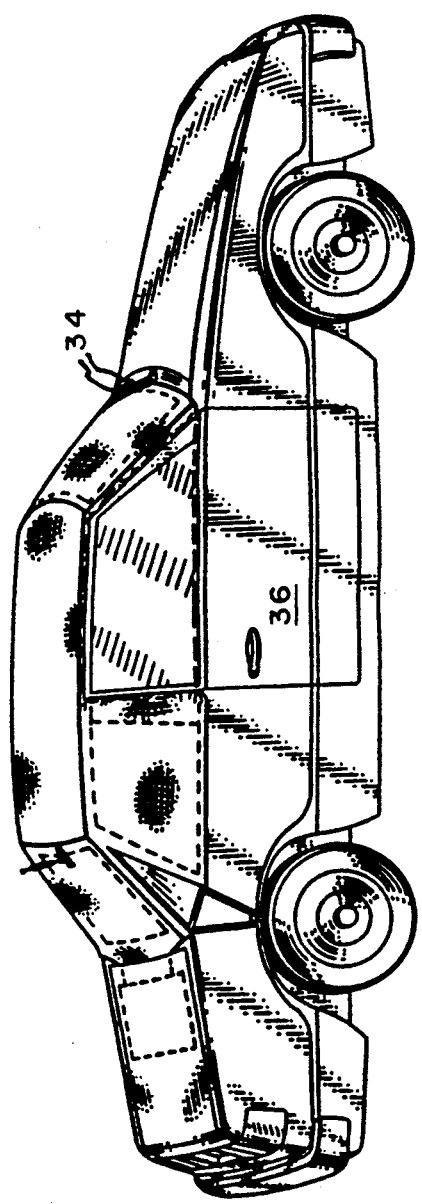
FIG. 8 shows a car cover disposed in place on a vehicle according to the first embodiment.

Means for anchoring the forward end of cover 10 to cover with the leading windshield of the vehicle includes the step of simply tucking the leading end edge margin of cover 10 beneath the windshield wiper blades 34 as shown in FIG. 8.

The embodiment shown in FIG. 8 also shows the concept of closing and locking the side doors 36 of the vehicle out to the downwardly depending portion of cover 10 so as to cover the door windows from the inside.

Figure 7:
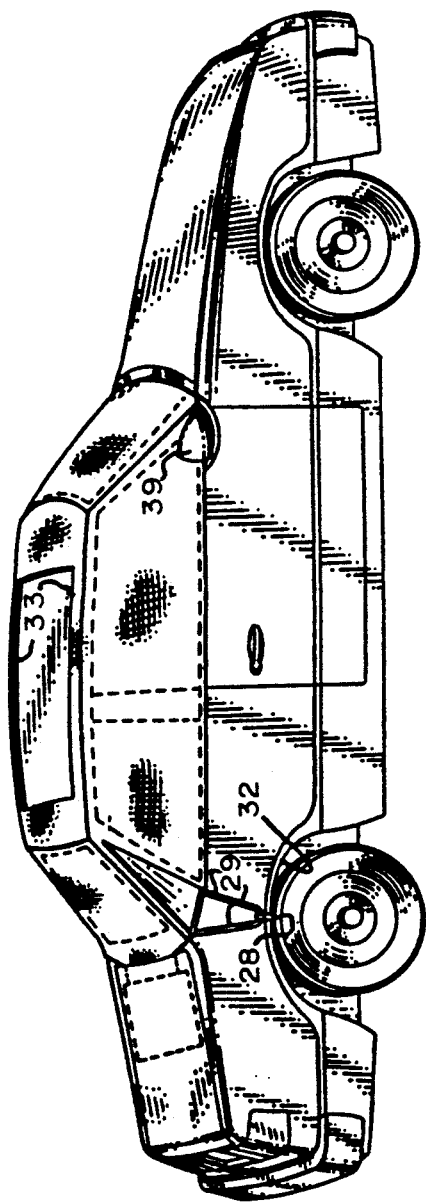
FIG. 7 shows a vehicle covered and protected by a car cover of the kind described according to another embodiment of the invention.

According to another embodiment as shown in FIG. 7, the leading end of cover 10 can be secured by means of elastic straps 37 disposed to be hooked about the outside mirrors on opposite sides of the vehicle such as mirror 39.

Thus cover 10 can be clamped by the side doors of the vehicle and locked, whereby the sides serve to cover the side windows while the vehicle remains locked.

From the foregoing it will be readily evident that there has been provided an improved car cover capable of being locked securely to the vehicle and in which the car cover carries it own storage pouch within a compartment of the vehicle.

In addition to the above, it will be evident that the number of appropriate openings such as for antenna and the like can be located variously through the cover.

The side edges of cover 10 further include elastic drawstring bands 30, 35 serving to accommodate variations in the size of the cabin portion of various vehicles.

In addition, it will be evident that pouch 11 can also be provided by employing a single panel 12 located closely in confronting relation to the underside of trunk lid 21.

Figure 9:
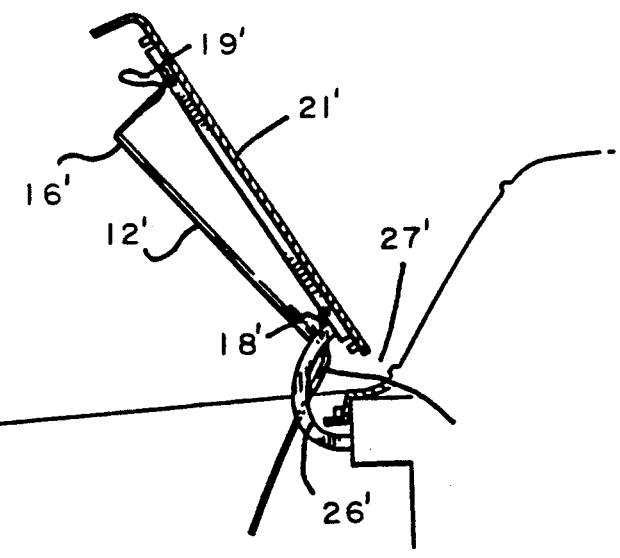
FIG. 9 shows an enlarged detail in side elevation of another embodiment of the invention.

Thus, as shown in FIG. 9, a single panel 12' hung from hooks 18', 19' disposes panel 12' in confronting relation with respect to the underside of trunk lid 21'. The trailing edge margin 16' can flex away from trunk lid 21' to accommodate the storage of a car cover therebetween.

I claim:

1. A vehicle cover including a flexible panel carried at one end thereof and a plurality of attachment means coupled to said panel for supporting said panel in confronting relation to the underside of the trunk lid of the vehicle to form a pouch for receiving the cover stored therein.

* * * * *